United States Patent [19]

Fukuda et al.

[11] Patent Number: 5,035,530
[45] Date of Patent: Jul. 30, 1991

[54] ACTUATOR UTILIZING SHAPE MEMORY ALLOY AND ARTICULATED ARM COMPRISING THIS ACTUATOR

[75] Inventors: Toshio Fukuda, Hara; Masanori Kanashige, Yokohama, both of Japan

[73] Assignee: Nippon Oil Co., Ltd., Tokyo, Japan

[21] Appl. No.: 421,834

[22] Filed: Oct. 16, 1989

[30] Foreign Application Priority Data

Oct. 17, 1988 [JP] Japan ............................ 63-259491

[51] Int. Cl.$^5$ ............................................. F16D 1/00
[52] U.S. Cl. ..................................... 403/404; 403/24; 60/527
[58] Field of Search ...................... 403/404, 24; 60/527

[56] References Cited

FOREIGN PATENT DOCUMENTS

| 61-84427 | 10/1984 | Japan . | |
|---|---|---|---|
| 61-17719 | 1/1985 | Japan . | |
| 62-77882 | 9/1985 | Japan . | |
| 219478 | 11/1985 | Japan ........................................ | 60/527 |
| 63-57977 | 8/1986 | Japan . | |
| 909275 | 3/1982 | U.S.S.R. ................................. | 60/527 |

Primary Examiner—Andrew V. Kundrat
Attorney, Agent, or Firm—Mason, Fenwick & Lawrence

[57] ABSTRACT

Disclosed is an actuator comprising a plate-shaped output member including a shape memory alloy, which is disposed between two bodies capable of relative movement. The output member comprises a shape memory alloy having such shape memory characteristics that a wave plate shape having at least one wave which extends in the direction orthogonal to the line connecting the attachment ends of the output member to be attached to the two bodies is formed in a specific temperature region. By utilizing the force of the output member for restorign the memorized shape in this specific temperature region, relative movement is caused between the two bodies constructing an articulated arm. The two bodies are turnably supported on a shaft and the above-mentioned actuator is arranged in the state set off from one side relatively to a plane including this shaft so that two bodies are relatively turned around this shaft.

17 Claims, 7 Drawing Sheets

| t | r/l | h/l |
|---|---|---|
| 0.5mm | 0.25 | 0.67 |
| 0.4mm  No. 0 | 0.21 | 0.50 |
| No. 1 | 0.22 | 0.57 |
| No. 2 | 0.31 | 0.63 |

ACTUATOR UTILIZING SHAPE MEMORY ALLOY AND ARTICULATED ARM COMPRISING THIS ACTUATOR

BACKGROUND OF THE INVENTION (1) Field of the Invention

The present invention relates to an actuator which is used for a robot or the like to cause relative displacement between two bodies. More particularly, the present invention relates to an actuator fabricated by using a shape memory alloy. Furthermore, the present invention relates to an articulated arm for a robot or the like, which comprises this actuator.

(2) Description of the Related Art

A robot moving on a wall surface of a building, a conduit or a cable, unlike a robot moving on the ground, should always move while assuming a correct posture thereof. Accordingly, an actuator used for an articulated arm of this moving robot is required to have a high output and a high torque. In general, however, as the output and torque increase, the weight of the actuator proportionally increases. Ideally, an actuator having such a high output/weight ratio as that of the muscle of a man is desirable.

Actuators heretofore used for robots or the like are mainly servo motors, hydraulic cylinders and pneumatic cylinders, and in these actuators, the output/weight ratios are much lower than that of the human muscle and from the viewpoint of the efficiency, these actuators are not adequate as the actuator for a moving robot.

Investigations have recently been made to reduce the size and weight of an actuator and simplify the mechanism by using a shape memory alloy (hereinafter referred to as "SMA") which is a dynamic mechanical material (see, for example, Japanese Patent Application Laid-open Specification No. 61-177179, No. 61-84427, No. 62-77882 and 63-57977). However, most of these investigations are directed to the use of linear or coil springtype SMA, and even if the output/weight ratio is improved, there arises a problem as regards the space occupied by the mechanism).

SUMMARY OF THE INVENTION

The present invention has been completed under this background, and it is a primary object of the present invention to provide an actuator having a higher output/weight ratio and a smaller size than the conventional SMA actuators.

Another object of the present invention is to provide an arm connected through a joint of a robot or the like by using the above-mentioned actuator.

According to the present invention, these objects can be attained by an actuator utilizing a shape memory alloy, which comprises two bodies capable of relative displacement, a plate-shaped output member comprising a shape memory alloy and attachment means for attaching both the attachment ends of the output member to the two bodies, respectively, wherein the output member comprises a shape memory alloy having such memory characteristics in a predetermined temperature region that a predetermined wave plate shape having at least one wave extending in the direction substantially orthogonal to the line connecting the attachment points of the two attachment ends of the output member is formed in the predetermined temperature region, thereby relative displacement is caused between the two bodies by the force of retaining the memorized wave plate shape according to changes of the temperature.

In this construction, when the temperature of the output member is changed, in the predetermined temperature region, the output member is transformed to show the memorized predetermined wave plate shape, whereby relative displacement is caused between the two adjacent bodies.

Preferably, the output member has a surface traversing the line connecting both the attachment ends of the output member, and the wave plate shape has at least two peaks on both the sides of said line, respectively. In this case, a stable linear output can be produced in opposite directions of said line.

It is preferred that the number of peaks be 2 through 4.

Both the attachment ends of the output member are formed to have a plane shape including said line. In this case, the output of the output member can be alined with the direction of said line.

A device for heating each output member is preferably disposed for controlling the temperature change in the output member. By arranging this heating device, the actuator can be operated at an optional position.

The heating device can be fabricated by covering the surface of the output member with an insulating material and winding an electrically heating coil on the insulating covering.

Two position-controlled bodies are supported on a shaft so that they can freely turn relatively to each other and actuators as mentioned above are arranged on both sides of a plane including said shaft, a rotational movement around the shaft is given to the two bodies and the relative angles between them can be changed. By using these bodies as one cell and connecting a plurality of cells turnably, the cells are relatively turned by predetermined angles by the actuators of the present invention, whereby an articulated arm which is freely bent can be constructed.

The present invention will now be described in detail with reference to embodiments illustrated in the accompanying drawings, from which the present invention will be understood more clearly. However, the scope of the present invention is by no means limited by these embodiments, but modifications can be freely made within the scope defined by the claims.

DETAILED DESCRIPTION OF THE PREFERRED EMBODIMENTS

Figure 1:
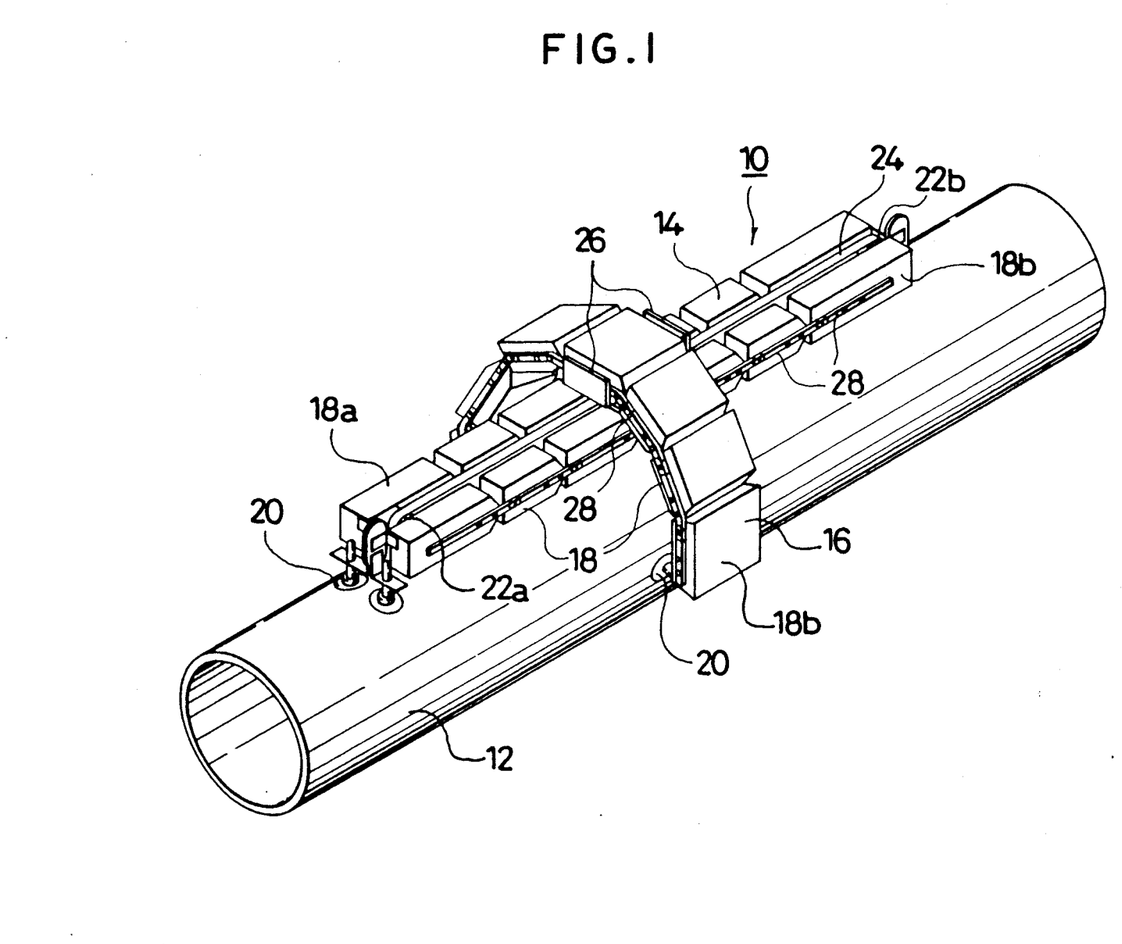
FIG. 1 is a robot comprising an actuator utizizing SMA according to the present invention.

FIG. 1 illustrates a moving robot which is constructed by using an articulated arm comprising the actuator of the present invention so that the robot can move on a pipe in the axial direction thereof. A first articulated arm 14 arranged on the top surface of a pipe 12 and extending in the axial direction of the pipe 12 and a second articulated arm 16 striding orthogonally over this top surface are connected to the moving robot 10 so that they can relatively move in the orthogonal direction. Each of the arms 14 and 16 comprises a plurality of cells 18 arranged in a line and supported so that adjacent cells 18 can be relatively rotated, and the connection angle between adjacents cells 18 is changed by the actuator described hereinafter. In the present invention, since the mutual connection angle between cells is changed, this connecting portion is called "a joint".

A plurality of attraction disks 20 that can be attracted to the surface of the pipe 12 by vacuum are arranged on both the ends of each of articulated arms 14 and 16. In the case where the articulated arms 14 and 16 do not move but are located at the same positions, the attraction disks 20 are actuated and attracted to the surface of the pipe 12 to prevent the articulated arms 14 and 16 from separating from the pipe 12.

Roller shafts 22a and 22b orthogonal to the longitudinal direction of the arm are rotatably mounted on the cells 18a and 18b on both the ends of the first articulated arm 14, respectively, and an endless slide belt 24 is hung between the roller shafts 22a and 22b. If one roller shaft 22a is rotated and driven through a reduction gear by an electromotor not shown in the drawings, the slide belt 24 is caused to make a sliding movement substantially along the entire length of the articulated arm 14.

The second articulated arm 16 is supported between a pair of guide plates 26 secured to the slide belt in an orthogonal direction to the slide belt 24 so that the second articulated arm 16 can slide in the longitudinal direction thereof. If the first articulated arm 14 is secured relatively to the pipe 12 by the action of the attraction disks 20, the second articulated arm 16 is carried by the guide plates 26 with the movement of the slide belt 24 in the longitudinal direction and is allowed to move in the longitudinal direction of the first articulated arm 14. In contrast, if the second articulated arm 16 is fixed relatively to the pipe 12 by the action of the attraction disks 20, by the movement of the slide belt 24 in the longitudinal direction, the first articulated arm 14 is moved in its longitudinal direction.

A similar slide belt is also arranged on the lower surface of the second articulated arm, and a pair of guide plates mounted on this slide belt support both the side surfaces of the first articulated arm so that the first articulated arm 14 can freely slide and move in its longitudinal direction. By adopting this arrangement, as in case of the first articulated arm 14, also the second articulated arm 16 can move in the direction orthogonal to the first articulated arm 14, and if the second articulated arm 16 is secured to the pipe 12, the first articulated arm 14 as a whole can be moved in the longitudinal direction of the second articulated arm 16.

Guide rails 28 extend in the longitudinal direction of the arm on both the side surfaces of each cell 18, and therefore, series of guide rails 28 are arranged on the side surfaces of the first and second articulated arms 14 and 16. These guide plates 28 are fitted and guided in guide grooves (not shown) formed on the inner faces of the guide plates of the relatively acting arms so that one articulated arm is smoothly guided to slide and move orthogonally to the other articulated arm.

Figure 2A:
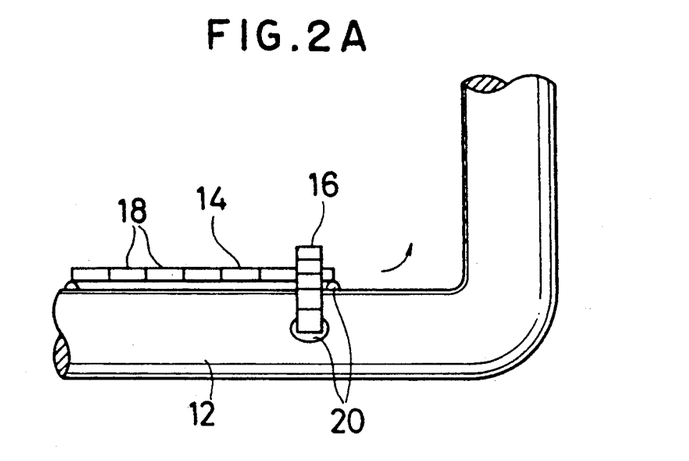
FIGS. 2A through 2C are diagrams illustrating the movement with the lapse of time of the robot shown in FIG. 1 on an L-shaped pipe.
Figure 2B:
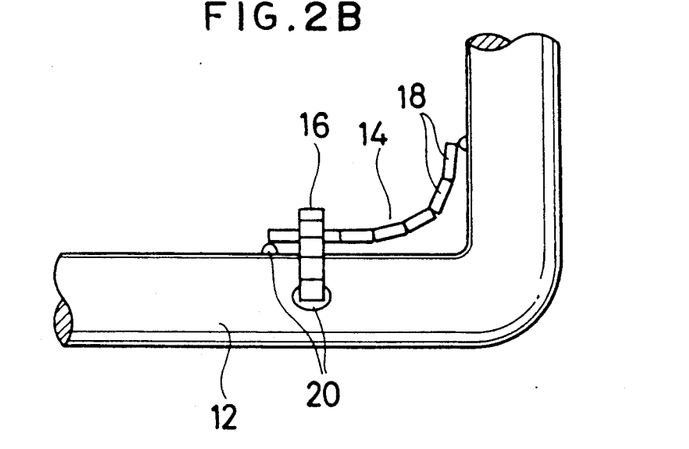
Figure 2C:
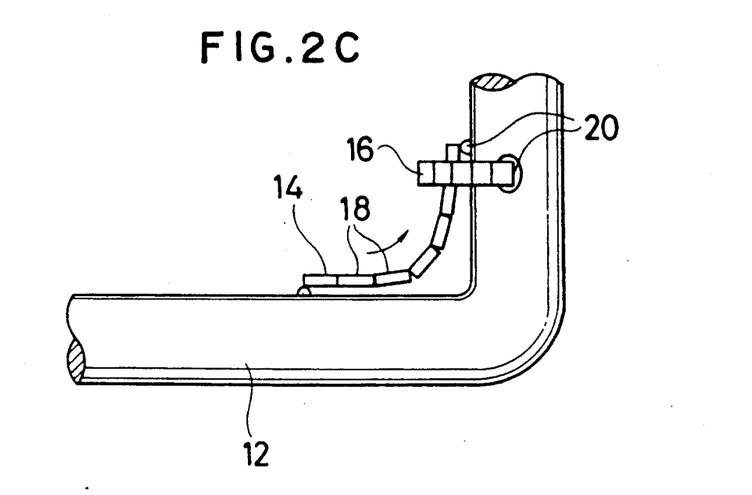

FIGS. 2A through 2C give an outline of the movement of the moving robot 10 having the above-mentioned construction, for example, in the longitudinal direction of the L-shaped pipe 12 on the top surface thereof. Referring to FIG. 2A, the second articulated arm 16 is fixed astride the pipe 12 orthogonally to the longitudinal direction of the pipe 12 by the attracting action of the attraction disks 20, and in this state, the attracting action of the attraction disks 20 of the first articulated arm 14 mounted on the top surface of the pipe 12 in the longitudinal direction thereof is released and then the slide belt 24 of the first articulated arm 14 is slid and turned in the longitudinal direction thereof by driving the electromotor.

By this sliding and turning of the slide belt 24, as shown in FIG. 2B, since the second articulated arm 16 is supported by the guide plates 26 of the slide belt 24 of the first articulated arm 14, the first articulated arm 14 is moved in the longitudinal direction thereof with the movement of the slide belt 24. At this point, the first articulated arm 14 is required so bend orthogonally upward along the pipe bent orthogonally in the L-shaped form. The present invention functions very effectively at this point. Namely, the actuator described hereinafter is operated to change the connection angle between adjacent cells 18 and satisfy the above requirement.

Then, the attraction disks 20 of the first articulated arm 14 are actuated to fix the first articulated arm 14 onto the top face of the pipe, and the attracting action of the attraction disks 20 of the second articulated arm 16 is released and sequentially, the slide belt 24 of the first articulated arm 14 is slid and moved, whereby the second articulated arm 16 is carried in the longitudinal direction of the first articulated arm 14 by the slide belt 24 to the position shown in FIG. 2C.

By repeating this operation, the moving robot 10 as a whole can be moved to the desired position on the pipe 12.

The adjacent cells of the first articulated arm 14 in the above-mentioned moving robot and the actuator of the present invention are illustrated in detail in FIGS. 3A through 3C and FIG. 4. In order to show the actuator in a simple manner, the heater is removed in these FIGS.

Figure 3A:
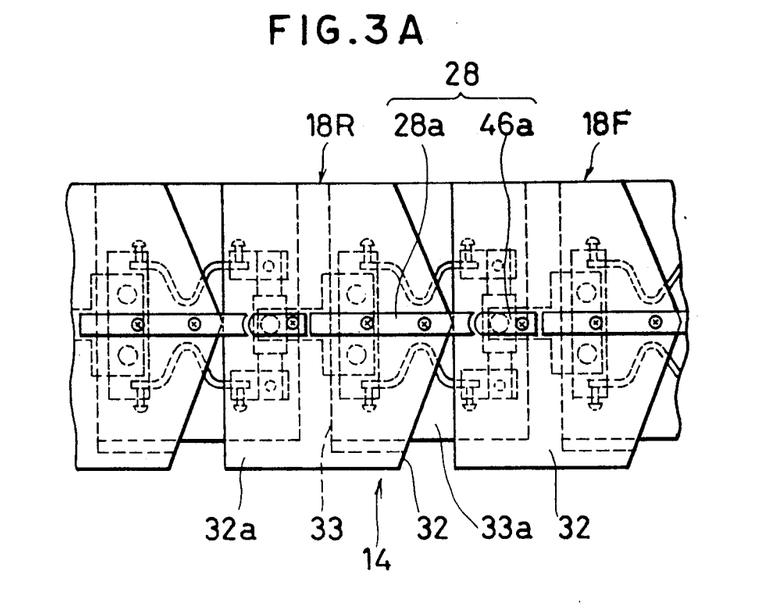
FIG. 3A is a front view showing a part of an articulated arm of the robot shown in FIG. 1, where a heater device is omitted.
Figure 3B:
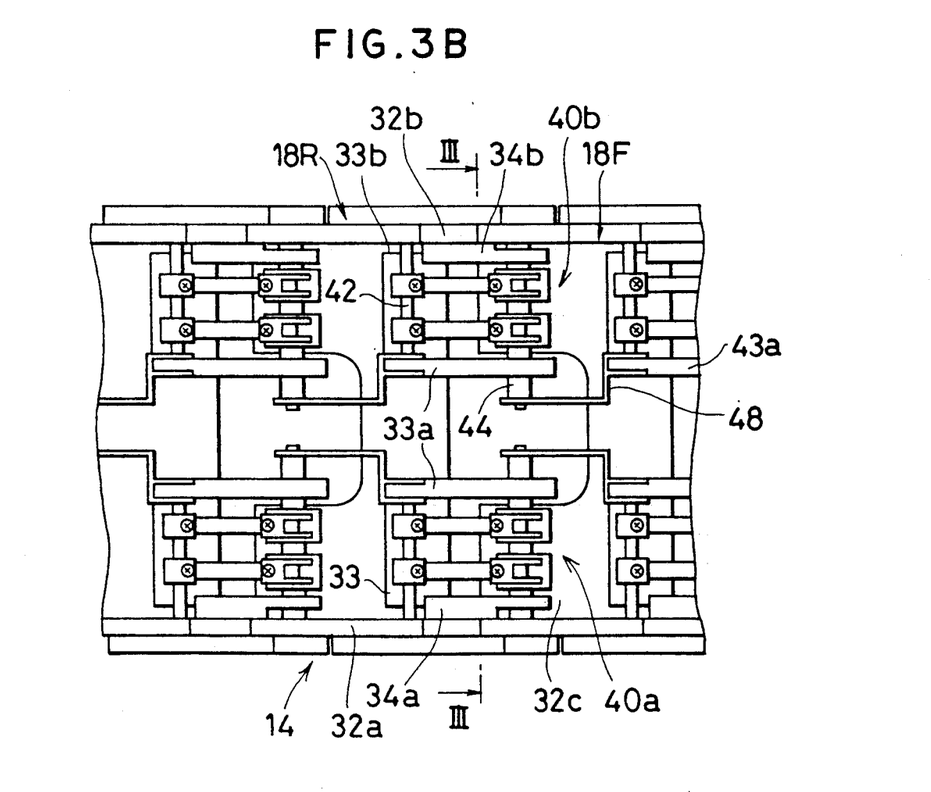
FIG. 3B is a plane view of the articulated arm shown in FIG. 3A.
Figure 3C:
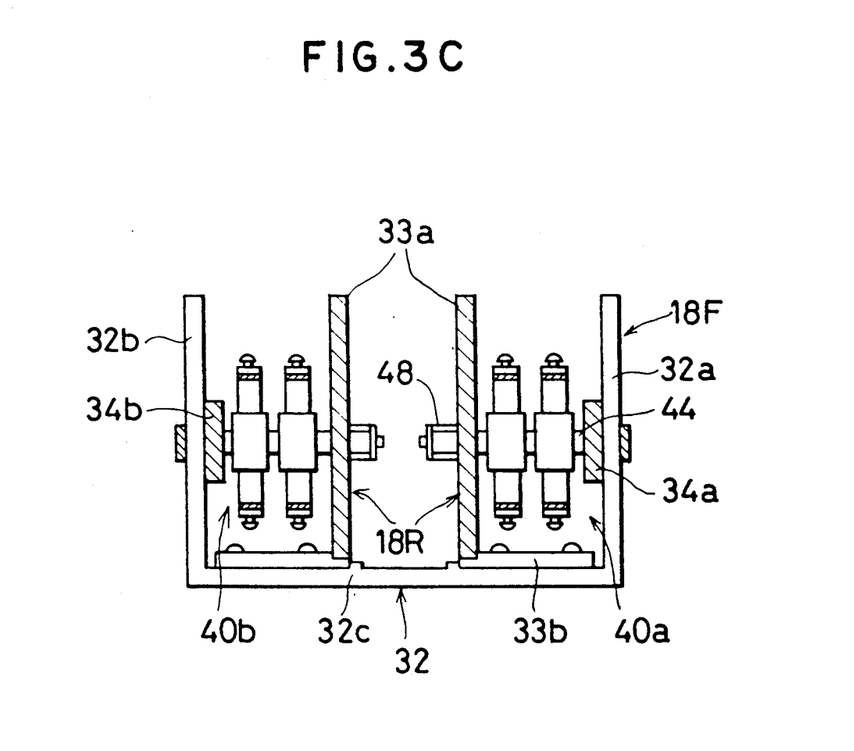
FIG. 3C is a view showing the section taken along the line III—III in FIG. 3B.

Relative front and rear adjacent cells 18F and 18R are pivoted turnably relatively to each other, and each cell comprised an outer frame 32 and a pair of inner frames 33 fixed to the outer frame 32 through screws. The outer frame 32 has home plate-like outer walls 32a and 32b elected vertically in parallel to each other on both the side edges of a bottom wall 32c in the longitidinal direction of the articulated arm. The inner frame 33 has inner walls 33a and 33b extending in parallel to each other into the front cell 18 with a predetermined space from the outer walls 32a and 32b. The rear ends of ear frames 34a and 34b having the front ends extending into the front cell 18F in parallel to the inner walls 33a and 33b are secured to the outer frame 32. Actuators 40a and 40b of the present invention and a heater device not shown in the drawings are arranged in a region defined by the inner walls 33a and 33b of the inner frame, the ear frames 34a and 34b and the outer walls 32a and 32b of the outer frame. In the following description, one actuator 40a alone is explained, and since the other actuator 40b has the same construction, the explanation of the actuator 40b is omitted.

A pair of upper and lower rear shafts 42 extending orthogonally to the longitudinal direction of the articulated arm are integrally fixed to the outer wall 32a and the rear parts of the inner wall 33a of the inner frame 33.

The front end portions of the ear frame 34a and the inner wall 33a are turnably supported on a front shaft 44 extending in parallel to the rear shaft 42. The front shaft 44 is integrally fixed to the front cell 18F. More specifically, the outer end portion of the front shaft 44 pierces through the outer wall 32 of the outer frame 32 of the front cell 18F and a rail 46a secured to the outer end of the front shaft 44 is fastened to the outer surface of the outer wall 32a through screws. The inner end of the front shaft 44 is secured to a front support 48 having the front end fixed to the inner wall 43a of the front cell 18F.

As is apparent from the foregoing description, the front and rear adjacent cells 18R and 18F turn relatively to each other with the front shaft 44 being as the center to construct a so-called joint where the connection angle between the two cells can be varied.

Figure 4:
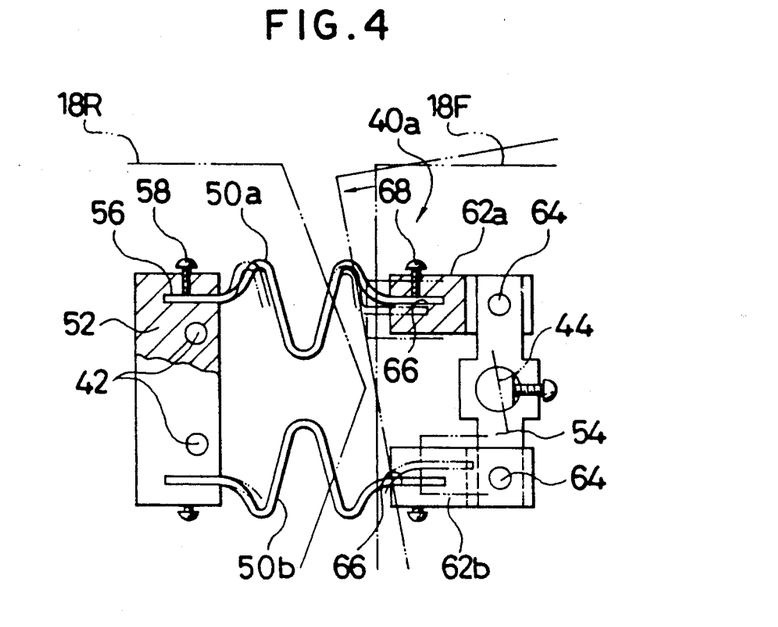
FIG. 4 is a longitudinally sectional front view showing the main portion of the actuator of the present invention.

As shown mainly in FIG. 4, an SMA plate (an SMA output plate) 50a is connected by a connecting device between a rear SMA plate support 52 secured to a pair of rear shafts 42 and a front swinging arm 54 secured to the front shaft 44 by screws and extending in the vertical direction to the shaft 44.

Slits 56 opened frontward are formed on the upper and lower end portions of the rear SMA plate support 52 and the rear ends of SMA plates 50a and 50b are fitted in the slits 56 and by strongly pressing the rear ends of the SMA plates 50a and 50b by top ends of screws 58 screwed in the end portion of the SMA plate support, the rear ends of the SMA plates are clamped to the SMA plate support 52. The upper and lower ends of the swinging arm 54 support SMA plate holders 58a and 58b turnably through pins 64. A slit 66 opened rearward is formed on each of the SMA plate holders 62a and 62b, and the front ends of the SMA plates 50a and 50b are fitted in these slits 66. By strongly pressing the front ends of the SMA plates 50a and 50b by the top ends of screws 68 screwed to the SMA plate holders 62a and 62b, the front ends of the SMA plates are clamped to the SMA plate holders 62a and 62b and the SMA plates are thus supported. The rear and front ends of the SMA plates may be preferably formed respectively in a plate which includes a line connecting two supported portion of the SMA plate by screws.

Two sets of the foregoing structures are arranged in the axial direction of the rear and front shafts 42 and 44 to construct one actuator 40a.

The SMA plate is a wavy plate formed by bending a flat band-like metal provided with at least one wave which extends substantially orthogonally to the line between two supported points by screws at both ends of the SMA plate. At normal temperature, plastic deformation of the SMA plate is possible and the SMA plate is attached with such a bending margin that the length of the SMA plate can be further increased in the state where the respective cells 18 are arranged in a line in the longitudinal direction of the articulated arm.

If the temperature is elevated beyond the transformation point (for example, 50° C.) of the SMA plate, the pitch of the above-mentioned wavy configuration is abruptly decreased and the SMA plate restores the memorized shape, with the result that the SMA plate contracts in the longitudinal direction of the articulated arm. SMA comprised nickel Ni and titanium Ti at a ratio of about 50/50 and minute amounts of impurities are contained. In the embodiment shown in the drawings, SMA plates having a shape as shown in FIGS. 5 and 6 in which the peak number Mt of the wave (also the trough is counted as the peak) is 3 are adopted.

Figure 5:
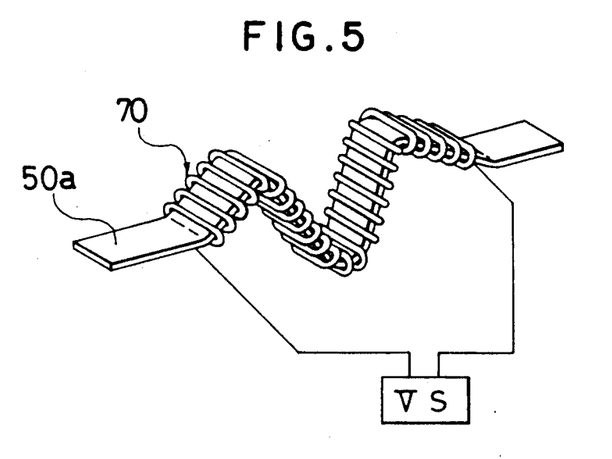
FIG. 5 is a perspective view illustrating a heater device attached to the actuator shown in FIG. 4.
Figure 6:
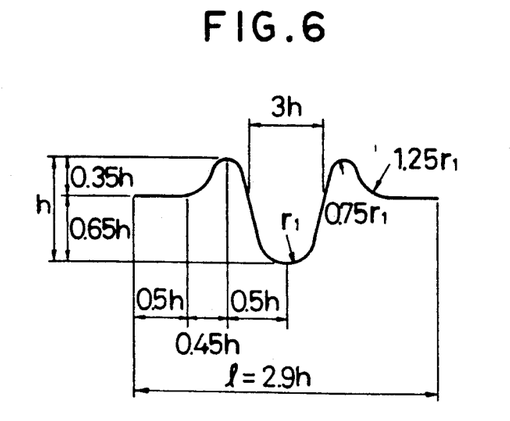
FIG. 6 is a diagram illustrating a dimensional relationship in a typical embodiment of an SMA output plate used in the SMA actuator used in the actuator of the present invention.

As shown in FIG. 5, the respective SMA plates are independently heated to a temperature exceeding the transformation point, and for this purpose, heaters 70 comprising a wound nicrome wire electrically connected to a voltage source VS are disposed. By independently performing the temperature control in these heaters 70, the SMA plates contract and the respective cells 18 are caused to make a movement of the joint. Needless to say, the outer surface of each SMA plate is covered with an insulating material.

A series of guide rails 28 arranged in the longitudinal direction of the articulated arm is disposed at the central portion of the outer surface of each cell 18. Some of these guide rails 28 constitute the above-mentioned rail 46a integrally fixed to the outer end of the front shaft 44, and the remaining guide rails 28 constitute a rail 28 extending from the front end of said rail 46a to the rear end of the rail 46a of the front cell 18F. Since the connection angle between the front and rear cells 18R and 18F is changed, the front end of the rail 28a and the rear end of the rail 46a are separated from each other to form a confronting curved surface. For the same reason, the front end line of the respective cells 18 has an arrow-like form, and the above-mentioned rail 28a passes through the top end of the arrow.

The operation of the actuator will now be described. Only the SMA plate 50a shown on the upper side in the drawings is heated by actuating the corresponding heater 70 while the SMA plate 50b on the lower side is maintained at normal temperature, whereby the SMA plate 50a on the upper side contracts to restore the memorized wavy bent configuration and the SMA plate holder 62a on the upper side of the cell 18F is attracted backward. Accordingly, the swinging arm 54 is turned counterclockwise in FIG. 4. Since the swinging arm 54 is secured to the front shaft 44 and the front shaft 44 is integrally secured to the front cell 18F, the front cell 18F is turned to a predetermined degree relatively to the rear cell 18F through the front shaft 44. At this point, since the temperature of the lower SMA plate 50b is lower than the transformation temperature, the lower SMA plate 50b is stretched frontward by the plastic deformation, and the attracting force of the upper SMA plate 50a is not reduced.

As is seen from the foregoing description, when the articulated arm 14 (as well as the articulated arm 16) is requested to be bent upward, the upper SMA plate of each cell is heated, and when the articulated arm is requested to be bent downward, the lower SMA plate is heated to contract it.

By utilizing the actuator of the present invention comprising SMA, even in the case where the attachment space is narrow and the conventional robot cannot be attached, the robot can be easily attached, and furthermore, the output/weight ratio can be greatly increased and the weight can be reduced.

FIGS. 7A through 7G shown memorized shapes of various SMA samples that can be used in the present invention. These samples are Ti-Ni alloy wavy shape plates having a thickness of 0.3 mm, 0.4 mm or 0.5 mm, a width of 5 mm and a length (length between attachment points supported by screws 58 and 68) of about 40 mm, which are heat-treated at 480° C. for 1 hour to maintain a shape as shown in the drawings. The transformation point is 48° C. In the drawings, r represents the radius of curvature in the bent portion, h represents the distance between the peaks of the wavy shape, l represents the length between the attachment portions in the output direction, and Mt represents the peak number (also the trough of the wave is counted as the peak).

The output characteristics of the SMA plates having the above-mentioned memorized shapes will now be described with reference to the test results.

At the test, a single sample having the above-mentioned shape at normal temperature is stretched in the length direction by a tester to stretch the above-mentioned shape and give a certain displacement. In this state, the sample is heated to the transformation point, and the force F of restoring the memorized shape (the output in the direction orthogonal to the wave) is measured. Incidentally, the displacement is adjusted to 5.0 mm, 6.0 mm, 7.5 mm, 9.0 mm, 10.0 mm or 15.0 mm.

Figure 8A:
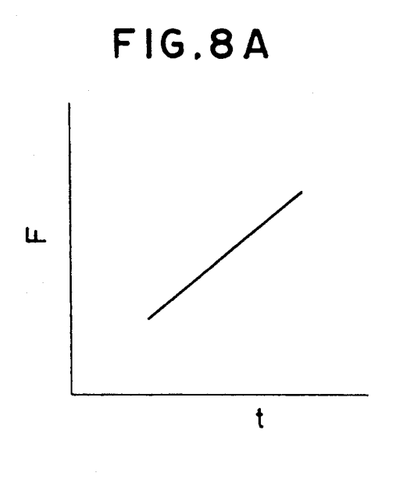
FIGS. 8A through 8D are graphs illustrating performance characteristics of the SMA output plate actuators fabricated by using SMA's shown in FIGS. 7A through 7G.

As can be easily estimated, the relation between the thickness t and the output F is such that the output F increases proportionally to the increase of the thickness t, as shown in FIG. 8A. Accordingly, it is considered that the output of the actuator will be increased by increasing the thickness T. However, with increase of the thickness t, processing becomes difficult, and especially, since the required radius r of curvature in the bent portion increases, it becomes difficult to increase the peak number Mt and the stroke length relative to the length l is limited.

Figure 7A:
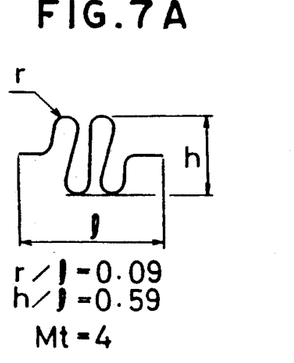
FIGS. 7A through 7G are diagrams illustrating another examples of the memory shape of the SMA output plate used in the actuator of the present invention.
Figure 7B:
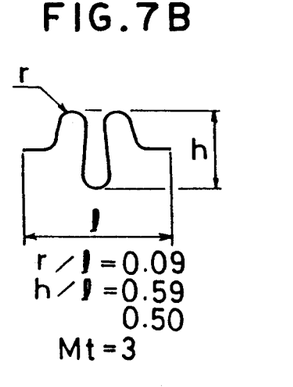
Figure 7C:
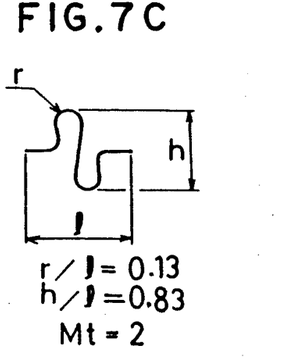
Figure 7D:
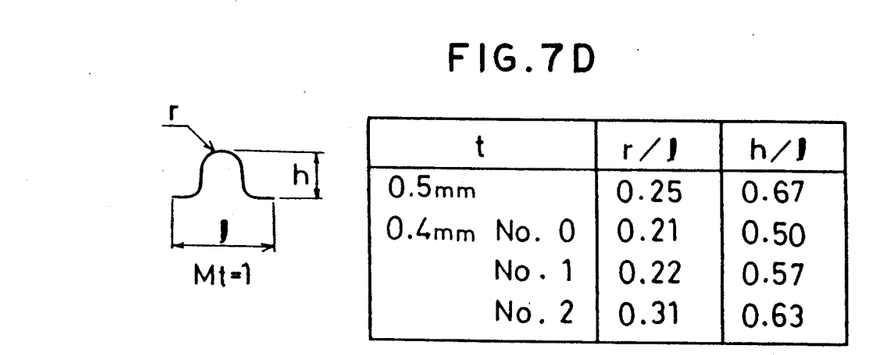
Figure 8B:
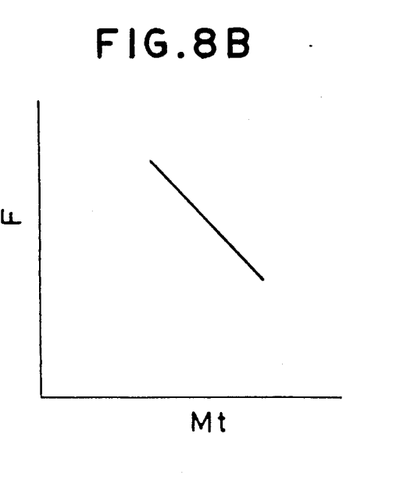
Figure 8C:
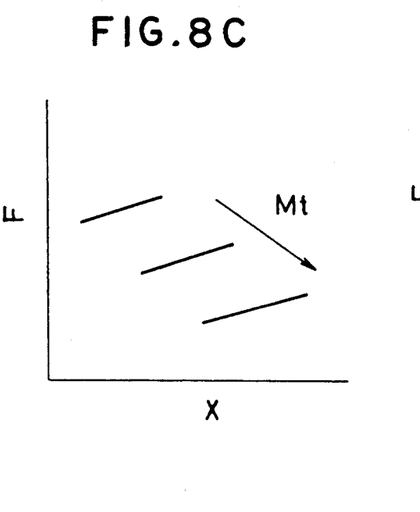
Figure 8D:
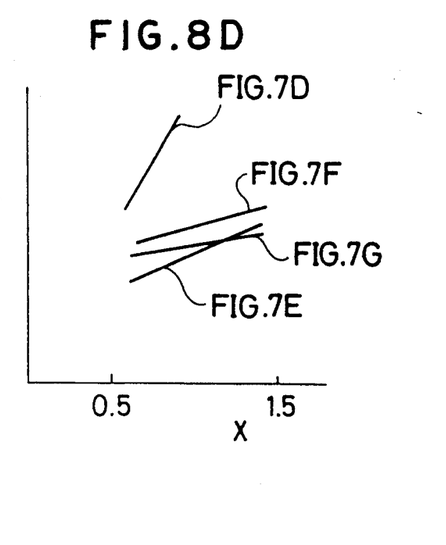

The relation between the peak number Mt and the output F of the output plate is such that as the mountain number Mt is small, the output F increases as shown in FIG. 8B. However, if the peak number Mt is increased, as shown in FIG. 7C, the displacement x, that is, the stroke length of the actuator, can be increased. In the case where the peak number Mt is the same, a smaller height h gives a larger output F, but if the height h is increased, the stroke length can be increased. Accordingly, an appropriate peak number and an appropriate peak height can be selected while taking the required output of the actuator-attached portion and the required stroke length into consideration. In the present embodiment, it is preferred that the peak number Mt be 2 to 4 and the height h between the peak peaks of the wave be smaller than the length l of SMA.

Figure 7E:
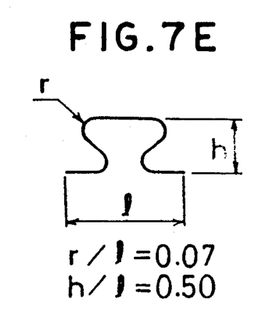
Figure 7F:
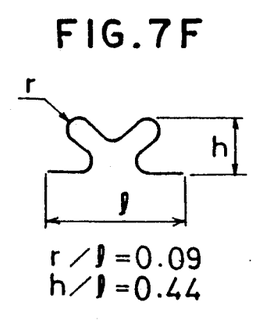
Figure 7G:
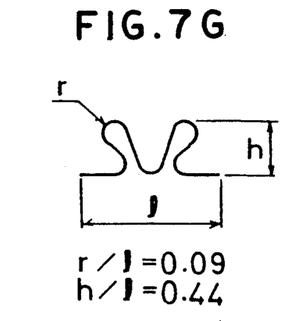

In a particular shape of the SMA plate in which the bent portions or wavy portions are deviated only one side with reference to the line connecting attached points of the SMA plate supported by screws or a complicated shape such as a heart-like shape as shown in FIG. 7E through 7G, the linearity of the output F to the displacement x is lower than in a shape having regular peaks (as shown in FIGS. 7A through 7D). In view of the magnitude and linearity of the output F, it is preferred that the SMA plate has a face traversing the line connecting the attachment portions thereof and peaks of the wave be present on both the sides of the line (the line in the length direction).

For the portion where special non-linear output characteristics are required, the configuration of the wave can be changed so that the requirements are satisfied.

An example of the actuator of the present invention will now be described. SMA of the type shown in FIG. 7B having a thickness t of 0.4 mm, a mountain-number Mt of 3 and h/l ratio of 0.50 is compared with an electromotor used mainly as the actuator of a robot, for example, a motor having a relatively good output/weight ratio (supplied by Minimotor Co., Switzerland; equipped with reduction gear 1/262), with respect to the output/weight ratio. Incidentally, the output obtained when a gear having a diameter of 10.0 mm is attached to the output shaft of the motor is adopted.

In this case, the output/weight ratio of the electromotor is 0.24 N/g, and the output/weight ratio of the SMA actuator is 32.7 N/g at highest and much higher than that of the electromotor.

When a coil spring type SMA actuator having the same performance (output=25.4B and displacement=10 mm) as those of the above-mentioned SMA actuator, for example is prepared, the wire diameter is $1.72 \times 10^{-3}$ m and the effective wind number is 11. The output/weight ratio of this actuator is 6.69 N/g and is higher than that of the electromotor but much lower than that of the SMA actuator having a wavy shape according to the present invention. Moreover, in case of the coil spring type SMA actuator, the value of the wire diameter of $1.72 \times 10^{-3}$ m incurs a problem of the response delay at the cooling step or the like.

Furthermore, the SMA actuator having a wavy shape according to the present invention can be attached easily and assuredly and is excellent in the reliability.

As is apparent from the foregoing description, the SMA actuator having a wavy shape according to the present invention has excellent performances over those of the conventional actuators in the field of an actuator for a robot for which a small size, a light weight and a high output are required, though the comparison cannot be simply made. Moreover, the SMA actuator of the present invention can satisfy the requirements of the stroke number and the like. Therefore, it is expected that the SMA actuator of the present invention will be broadly used effectively.

We claim:

1. An actuator utilizing a shape memory alloy, comprising:

two bodies capable of relative displacement, a plate-shaped output member comprising a shape memory alloy, the output member having two attachment ends and the attachment ends having respective attachment points, attachment means for attaching both the attachment ends of the output member to the two bodies, respectively, and a heating device for controlling the temperature of the output member, the heating device comprising a nichrome wire wound around the output member, wherein the output member comprises a shape memory alloy having such memory characteristics that a predetermined wave plate shape having at least one wave extending in the direction substantially orthogonal to the line connecting the attachment points of the two attachment ends of the output member is formed in a predetermined temperature region, and relative displacement is caused between the two bodies by the force of retaining the memorized wave plate shape according to changes of the temperature.

2. An actuator utilizing a shape memory alloy according to claim 1, wherein the output member has a surface traversing the line connecting both the attachment points of the attachment ends of the output member, and the wave plate shape has at least two peaks on both of the sides of said line, respectively.

3. An actuator utilizing a shape memory alloy according to claim 2, wherein the output member has two to four peaks in the wave plate shape.

4. An actuator utilizing a shape memory alloy according to claim 2, wherein the output member the distance between peaks of the wave plate shape on both the sides of said line is smaller than the length between the attachment points.

5. An actuator utilizing a shape memory alloy according to claim 1, wherein the surface of the output member is covered with an insulating material.

6. An actuator utilizing a shape memory alloy according to claim 1, wherein said two bodies are relatively turnably supported on a shaft and said line connecting the two attachment points of the attachment ends of the output element is set off from said shaft.

7. An actuator utilizing a shape memory alloy according to claim 6, wherein at least one of said attachment means is constructed so that the output member is substantially and turnably pivoted on the corresponding body at the position set off from said shaft.

8. An actuator utilizing a shape memory alloy according to claim 7, wherein one of said output members and its corresponding attachment means is arranged on each of both the sides of a plane including a shaft turnably supporting said two bodies, and each said output member has a bending margin in the output direction.

9. An articulated arm having an actuator utilizing a memory shape alloy, comprising:
a shaft,
at least two cells connected by the shaft so that the cells can freely turn relatively to each other,
at least two plate-shaped output members including a shape memory alloy, the output members each having two attachment ends and the attachment ends having respective attachment points, and
attachment means for arranging said output members on both the sides of a plane including said shaft and for attaching the attachment ends of the output members to two adjacent cells, respectively,
wherein each output member comprises a shape memory alloy having such memory characteristics that a predetermined wave plate shape having at least one wave and extending in the direction substantially orthogonal to the line connecting the attachment points of the two attachment ends of the output member is formed in a predetermined temperature region, and said adjacent cells are relatively turned around said shaft by the force of retaining the memorized wave plate shape according to changes of the temperature.

10. An articulated arm utilizing a shape memory alloy according to claim 9, wherein each output member is attached to the attachment means with a bending margin in the output direction.

11. An articulated arm utilizing a shape memory alloy according to claim 9, wherein each output member has a surface traversing the line connecting both the attachment points of the attachment ends of the output member, and the wave plate shape has at least two peaks on both the sides of said line, respectively.

12. An articulated arm utilizing a shape memory alloy according to claim 9, wherein both attachment ends of each output member are formed to have a plane shape substantially including said line.

13. An articulated arm having an actuator utilizing a memory shape alloy, comprising:
a shaft,
at least two cells connected by the shaft so that the cells can freely turn relatively to each other,
at least two plate-shaped output members including a shape memory alloy, the output members each having two attachment ends and the attachment ends having respective attachment points,
attachment means for arranging said output members on both the sides of a plane including said shaft and for attaching the attachment ends of the output members to two adjacent cells, respectively, and
a heating device for controlling the temperature of each of the output members, the heating device comprising a nichrome wire wound around each output member,
wherein each output member comprises a shape memory alloy having such memory characteristics that a predetermined wave plate shape having at least one wave and extending in the direction substantially orthogonal to the line connecting the attachment points of the two attachment ends of the output member is formed in a predetermined temperature region, and said adjacent cells are relatively turned around said shaft by the force of retaining the memorized wave plate shape according to changes of the temperature.

14. An articulated arm utilizing a shape memory alloy according to claim 13, wherein each output member is attached to the attachment means with a bending margin in the output direction.

15. An articulated arm utilizing a shape memory alloy according to claim 13, wherein each output member has a surface traversing the line connecting both the attachment points of the attachment ends of the output member, and the wave plate shape has at least two peaks on both the sides of said line, respectively.

16. An articulated arm utilizing a shape memory alloy according to claim 13, wherein both attachment ends of each output member are formed to have a plane shape substantially inside said line.

17. An actuator utilizing a shape memory alloy according to claim 1, wherein both the attachment ends of the output member are formed to have a plane shape substantially including said line.

* * * * *